United States Patent [19]

Hay

[11] Patent Number: 4,968,426
[45] Date of Patent: Nov. 6, 1990

[54] FINE ALPHA ALUMINA ULTRAFILTRATION MEMBRANES

[75] Inventor: Robert A. Hay, Dudley, Mass.

[73] Assignee: Norton Company, Worcester, Mass.

[21] Appl. No.: 398,863

[22] Filed: Aug. 25, 1989

Related U.S. Application Data

[63] Continuation-in-part of Ser. No. 131,774, Dec. 11, 1987, abandoned.

[51] Int. Cl.$^5$ .................. B01D 67/00; B01D 69/04; B01D 71/02
[52] U.S. Cl. ................. 210/490; 210/492; 210/497.01; 210/500.23; 210/500.25; 210/500.26; 210/506; 210/510.1; 427/244; 427/246; 427/247; 427/376.2; 427/380; 427/383.5
[58] Field of Search ........... 210/488, 489, 490, 492, 210/496, 497.01, 500.25, 500.26, 500.27, 506, 510.1, 500.23; 427/243, 244, 245, 246, 247, 376.2, 380, 383.5; 55/158

[56] References Cited

U.S. PATENT DOCUMENTS

| | | | |
|---|---|---|---|
| 4,069,157 | 11/1978 | Hoover et al. | 210/651 |
| 4,412,921 | 11/1983 | Leung et al. | 210/500.3 |
| 4,562,021 | 12/1985 | Alary et al. | 210/500.27 |
| 4,623,364 | 11/1986 | Cottringer | 51/309 |
| 4,689,150 | 8/1987 | Abe et al. | 210/500.26 |

OTHER PUBLICATIONS

Leenaars et al., "Porous Alumina Membranes", *Chemtech*, 9/1986, pp. 560–564.
McArdle et al., "Seeding with Gamma-Alumina ...", Journal of American Ceramic Society, vol. 69, No. 5, pp. C98–C101 (1986).
Leenaars et al., "The Preparation and Characterization of Alumina Membranes ...", J. Materials Science, pp. 1077–1088, (1984).
Wilson et al., "The Porosity of Aluminum Oxide ...", 82 J of Colloid and Interface Science, pp. 507–517 (1981).

*Primary Examiner*—W. Gary Jones
*Attorney, Agent, or Firm*—Arthur A. Loiselle, Jr.

[57] ABSTRACT

Strong and durable alpha alumina ultrafiltration membranes with effective separating layers having effective pore diameters less than about 50 nm, and particularly at almost any point within the range of about 10 to about 50 nm, can be produced by seeding boehmite sols with appropriate seeds, such as very fine alpha alumina with a specific surface area of more than 100 sq. m. per g, gelling a thin layer of the sol by contact with a microfilter support, drying the gel, followed by controlled heating of the coated support both to convert the boehmite to alpha alumina and to simultaneously control the effective pore diameter of the resultant membrane.

26 Claims, 3 Drawing Sheets

FINE ALPHA ALUMINA ULTRAFILTRATION MEMBRANES

CROSS-REFERENCE TO RELATED APPLICATION

This application is a continuation-in-part of U.S. Ser. No. 131,774, filed Dec. 11, 1987, now abandoned.

TECHNICAL FIELD

This invention relates to the field of ultrafiltration membranes, which are defined for the purposes of this application as membranes with an effective pore size of 50 nanometers (nm) or less. More particularly, this invention relates to fine ultrafiltration membranes, i.e. membranes having effective pore sizes of 35 nm or less. This invention further relates to a method of controlling the pore size of alpha alumina ultrafiltration membranes.

Ultrafiltration membranes, as known in the art, may be used as filters, selective diffusion, or effusion barriers, osmosis or electrophoresis membranes, zones for controlled reactions between gas and liquid phases, etc. The membranes may be used unsupported, but more often they are backed by much stronger and thicker supporting membranes with substantially larger pore sizes, so that the supporting membrane contributes mechanical support without significantly restricting the flow of materials through the ultrafiltration membrane. A convenient and frequently used support is a microfilter, which has an average pore size between about 100 and 5000 nm.

For supported ultrafiltration membranes, or for any other type of filter or membrane with two or more layers having different pore sizes, the layer with the finest pore size, which controls the separation effectiveness of the total assembly of membrane plus support, is denoted herein as the "effective separating layer" or "ESL".

TECHNICAL BACKGROUND

It is known in the art to prepare filtration membranes of gamma alumina by depositing boehmite or bayerite particles from sols onto microporous alumina supports, then drying the deposit. The thickness of the deposited gel can be controlled by control of the time of contact between the sol and the support and the characteristics of the sol, as taught by A. Leenaars et al., 16 *Chemtech* 560–64 (1986). As described in this reference, the membranes may be used either in dried, but still chemically hydrated form, or they may be heated to give unhydrated gamma alumina ESL's to alpha alumina. However, the pore size rapidly increases as the alumina changes from the gamma or delta phases to alpha, i.e. from about 5 nm to 78 nm, and also the porosity decreases from about 55% to 41%. (page 562)

Gamma alumina is known to have significantly less corrosion resistance than alpha alumina in a variety of practically important environments, such as sodium hypochlorite, sodium hydroxide, and nitric acid solutions in water.

A. Leenaars et al., 19 *Journal of Materials Science* 1077–1088 (1984) shows in Table I alpha alumina membranes with minimum pore sizes above 38 nm.

S. Wilson et al, 82 *Journal of Colloid and Interface Science* 507–17 (1981), report alpha aluminas with pore sizes of as little as 25 nm, formed from an intermediate gamma alumina phase with pores about 0.8 nm in size.

The products reported by Wilson are believed not to be in membrane form, but rather in the form of powders.

It is also known that the transformation of gelled amorphous alumina hydrates to polycrystalline alpha alumina can be accomplished more rapidly and at lower temperatures than would otherwise be required by seeding or nucleating the deposit with small particles of crystalline alumina. Cottringer et al U.S. Pat. No. 4,623,364 teaches that alpha alumina is effective for this purpose, and J. McArdle et al, 69 *Journal of the American Ceramic Society*, C98–C101 (1986) teaches that gamma alumina may also be used. These teachings, as well as all previous teachings of nucleated transformation known to the applicant, have been applied to bulk samples in which a goal is the achievement of high density in the product, not the preparation of porous membranes. Indeed, because seeding or nucleation is known to promote densification, as taught by the above references, seeding would be expected to make more difficult the attainment of consistent controlled fine porosity, as required for the preparation of the present ultrafiltration membranes.

SUMMARY OF THE INVENTION

Supported fine ultrafiltration membranes in which the ESL consists essentially of alpha alumina can be obtained by (a) coating a microfilter support with a layer of aluminum hydrate gel having dispersed therein an effective amount of finely divided crystalline seed particles, (b) drying the gel layer and support, and (c) heating the dried gel layer and support at a temperature and for a sufficient time to convert the dried gel into alpha alumina while not reducing its total porosity to less than about 30 percent. In this context, "consisting essentially of alpha alumina" means that the ESL is at least sixty percent by volume alpha alumina and that the ESL has substantially the same resistance to chemical attack as characterizes commercially pure polycrystalline alpha alumina.

DESCRIPTION OF THE PREFERRED EMBODIMENTS

Figure 1:
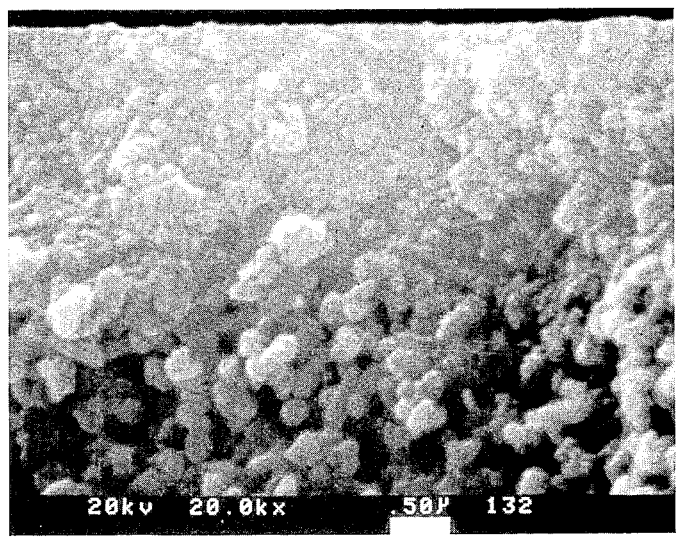
FIGS. 1 and 2 are photomicrographs of the inner part of a cross section and of the inner diameter surface respectively of a tube made by example 2.

The preferred supports for ultrafilters according to this invention are substantially 100% alpha alumina tube microfilters available from Norton Company, Worcester, MA under the trademark CERAFLO. These tubes are available in average pore sizes from 0.2 microns to 5 microns or more, with the ESL on either the inside or outside of the tube.

The preferred alumina hydrate is boehmite, and the preferred source of colloidal boehmite is a commercially available product, SB Plural Alumina supplied by Condea. The colloidal dispersion as supplied is preferably diluted with water if necessary to bring its concentration within the range of about 0.5–10 weight percent (wt. %) ALOOH content. The dispersion of proper boehmite concentration is normally slightly acidified to bring it to the point of incipient gelation. Any convenient fairly strong acid that does not leave any undesirable residue upon heating, such as hydrochloric, perchloric, or acetic acid may be used, but nitric acid is generally preferred.

Before or after acidification, the boehmite dispersion is mixed with a suitable amount of fine crystalline seeds. Alpha alumina seeds are generally preferred, but gamma alumina and alpha iron oxide, or any crystal that will promote the growth of alpha alumina may also be used. The total of crystalline solid in the seeds preferably is about 0.05 to about 1 wt. % of the weight of boehmite in the dispersion, and still more preferably is about 0.4 to about 0.8 wt. %. The seeds should be sufficiently small so that they have a specific surface area of at least 35, preferably at least 100, m$^2$/g. The presence of minor amounts of common impurities such as silica, magnesia, and titania in predominantly alumina seeds has not been found to do any significant harm, provided that these impurities are not present in sufficient amount to significantly reduce the chemical resistance of the polycrystalline alpha alumina ESL formed in the process according to this invention.

The seeds preferably are alpha alumina, and the preferable source of seeds is from the attrition of predominantly alumina milling media during vibratory milling, as described in U.S. Pat. No. 4,623,364, the entire specification of which is hereby incorporated herein by reference.

The thickness of the gel layer deposited on the support can be controlled by the time of contact of the dispersion with the support, as is generally known in the art, and the thickness of the filtering layer eventually formed is generally close to that of the gel layer from which it is formed. Layers thicker than about 5 microns have been found to tend to crack during drying and/or firing, but multiple coating of successive layers, with intermediate drying and firing of each individual layer, can be used to build up effective filtering layers 20 microns thick or more, if such thick ultrafine layers are needed.

Drying at room temperature of gel layers prepared according to this invention is preferred, and may generally be accomplished in 24 hours or less. The dried layer must be carefully and slowly heated to convert it to alpha alumina, in order to avoid cracking and/or the development of undesirable large pores in the layer. A suitable heating program for a layer of dried gel up to 5 microns thick is to increase the temperature at a rate of about 50° C. per hour until 900° C., hold at 900° C. for about three hours, raise the temperature at a uniform rate to 1000° C. over about two hours, and hold at about 1000° C. for one hour. Cooling should be at a rate of no more than about 300° C./hr.

In order to minimize crack or large pore formation in the ESL's of this invention, it is often advantageous to build up ESL's substantially thicker than one micron by a series of depositions about one micron thick, with intermediate drying and heating after each deposition only to a temperature, such as about 600°-900° C., sufficient to convert the hydrate to gamma rather than alpha alumina. After the total desired thickness of the ESL has been built up in predominantly gamma alumina, additional heating to a higher temperature will convert the entire layer substantially to alpha alumina.

It has also been found advantageous to use a water-soluble polymer such as poly(vinyl alcohol), poly(ethylene glycol), or cellulose ether in the formulation to reduce the chances of forming cracks or large pores. Use of such polymers is especially valuable when the gel layer is applied in thicknesses greater than about 5 microns and/or over a support with exceptionally large pores.

When difficulty was experienced in preparing crack-free ESL's on supports having large pores, it was often overcome by depositing an intermediate layer having somewhat larger pores than that of the ESL, drying that intermediate layer, and either firing it or leaving it in the green state until a green ESL according to this invention has been prepared atop the intermediate layer. The intermediate layer may be applied according to methods taught in French Patent No. 2,502,508, the disclosure of which is incorporated herein by reference.

The practice of this invention may be illustrated by the following examples in which all parts and percents are by weight unless otherwise specified.

EXAMPLE 1

An aqueous dispersion containing 1 % boehmite, 0.006 % alpha alumina seeds, and 0.07 mole HNO$_3$ per mole of boehmite was prepared and used to coat a 20–25 cm long cylindrical microfiltration tube having a 3 mm inside diameter and 5 mm outside diameter. The tube, commercially available under the CERAFLO from Norton Company, Worcester, Mass., had an initial ESL with an average pore size of about 200 nm.

The support tube was first coated with an intermediate layer of readily sinterable, 99.5% or better purity alpha alumina particles, having an average diameter of about 200 nm, from an aqueous dispersion of such particles to produce a layer about 1 to 10 microns thick on the interior of the tube. This intermediate layer was dried at 22° C. for 24 hours and then fired at 1000° C. for 3 hours.

The boehmite dispersion described above was drawn up into the precoated tube and then allowed to drain out as soon as it had reached the top. This operation, which required about two seconds, produced a green gel layer about 1–2 microns thick atop the intermediate layer. Even though the top of the tube was exposed for less time than the bottom, the gel layer was fairly uniform over the entire length of the tube because the thickness has been found to depend primarily on the extent to which the sol penetrates the tube by capillary action, not on any time dependent settling rate such as might control the thickness on a horizontal surface.

The tube with its deposited gel layer was dried at 24° C. for 24 hours and the temperature was then increased at a rate of 20° C. per hour from room temperature to 600° C., held there for six hours, increased at a rate of 50° C. per hour to 900° C., held there for three hours, raised at a rate of 50° C. per hour to 1000° C., and held there for one hour.

The ultrafiltration membrane produced had an ESL 1–2 microns thick having an average pore size of 10–12.5 nm, a total porosity of about 40%, and consisting essentially of alpha alumina. No x-ray diffraction lines characteristic of other crystal forms of alumina could be detected.

EXAMPLE 2

The procedure of Example 1 was repeated until the application of the boehmite gel layer. In this example, this layer of gel was dried and then heated only through the part of the temperature program through six hours at 600° C. A second gel layer was then applied over the first in the same manner as the first layer. From this point on, the process continued as in Example 1 after the application of the single gel layer. The resulting product had the same characteristics as that of Example 1, except that the ESL thickness ranged from 1–3 microns.

Figure 2:
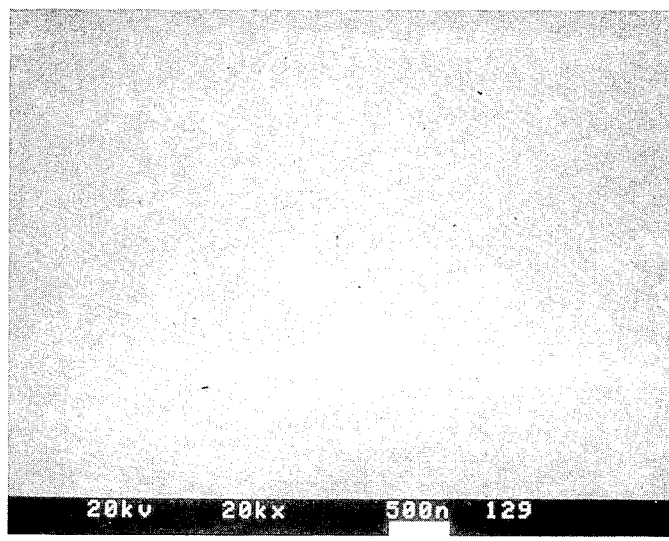
Figure 3:
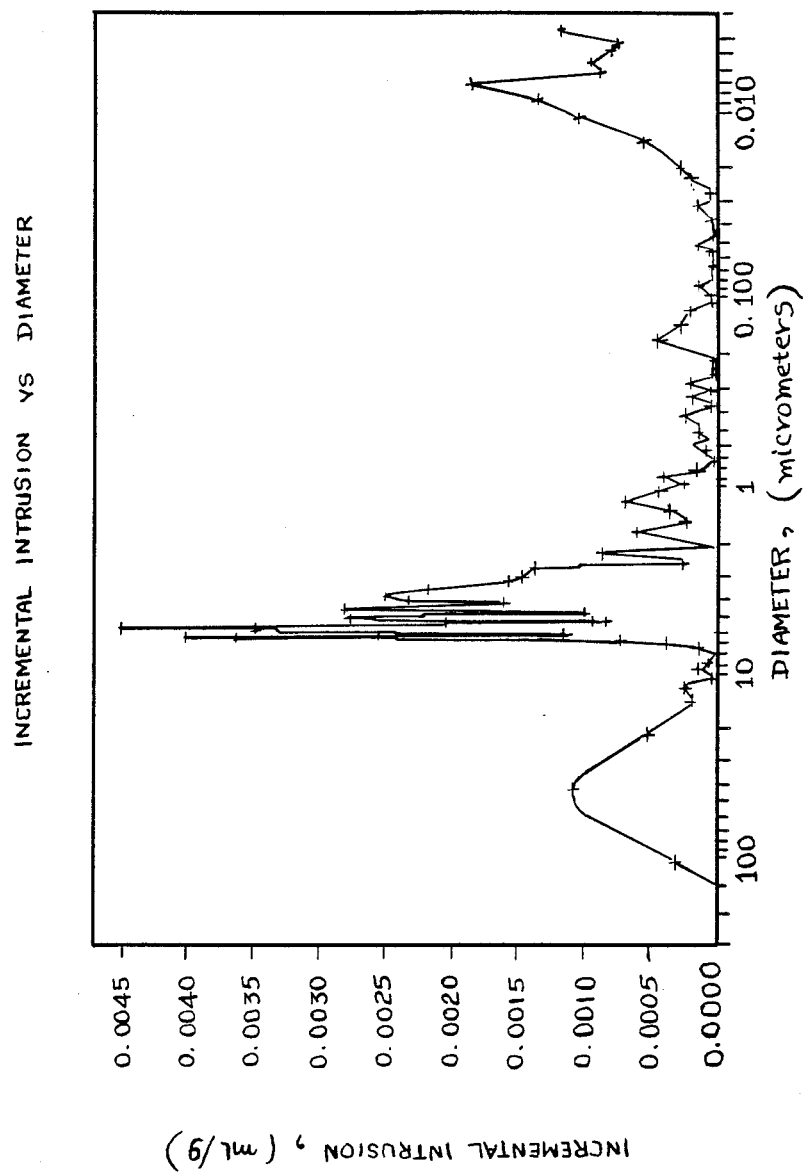
FIG. 3 shows a mercury porosimetry analysis of the tube of example 2.

FIGS. and 1 and 2, which are at the same scale, are photomicrographs of the inner part of a cross section and of the inner diameter surface respectively of the tube made by this example. The upper part of FIG. 1 shows the ESL, with pores barely detectable at this scale, in contrast to the lower part of the Figure, representing the initially coated alpha alumina layer with an effective pore diameter of about 0.1 micron. FIG. 2 shows the extraordinarily uniform inner surface achieved by the method of this invention. FIG. 3 shows a mercury porosimetry analysis of the tube of this example. The porosity shown in the region less than about 0.027 microns represents the ESL of this membrane.

EXAMPLE 3

The procedure of Example 2 was repeated except that (i) the intermediate coating with dispersed alpha alumina and drying and firing of such coating was not performed and (ii) the first layer of boehmite gel was dried but not fired before the second gel layer was applied over it.

EXAMPLE 4

The procedure of Example 1 was repeated except that the heating (but not the drying) of the intermediate layer of alpha alumina was eliminated. This produced a tube having an ESL of the same characteristics as in Example 1, underlain by another layer of alpha alumina 1–10 microns thick having a total porosity of about 35%. The filtering characteristics of the tubes of this example were essentially the same as those from Example 1. In repeating both examples, however, it was found that the method of this example was more reliable in producing filters free of cracks and large pores than the method of Example 1.

Use of Membranes Made According to the Invention

More than fifty total membranes were made in accordance with Examples 1–4 and tested for their effectiveness in filtering various macromolecular dispersions. In these tests, a fixed volume of each dispersion was repeatedly pumped through the interiors of the membranes under sufficient pressure to maintain a pressure drop of about 7 kilopascals across the membrane. The permeate was sampled every five minutes until a constant concentration of dispersate was determined in the permeate in two successive samplings.

Membranes made according to any of Examples 1–4 were found to have substantially the same effectiveness in separating the materials tested. All of the membranes, except for a small fraction that had cracked or developed anomalously large pores during processing, rejected over 95% of bovine serumn albumin having an average molecular weight of about 67,000, over 80% of a polyvinylpyrrolidone dispersion with an average molecular weight of about 160,000.

EXAMPLES 5–8

These examples were prepared as in Examples 1–4, except that the final heating at 1000° C. was for three hours rather than one hour as in the previous examples. The resultant tubes had alpha alumina ESL's having average pore sizes of about 33 nm and about 35–40% total porosity.

EXAMPLES 9–12

These examples were prepared as in Examples 1–4, except that in each case the final heating at 1000° C. was for nine hours rather than one hour. The resultant tubes exhibited alpha alumina ESL's having average pore sizes of about 45 nm and about 35–40% total porosity.

EXAMPLE 13

A support tube as in Example 1 was used along with a boehmite sol containing 5.6% boehmite, 0.034% seeds having a specific surface area of 110 m$^2$/g and containing at least 80% alpha alumina, and sufficient nitric acid to provide 0.07 mole $HNO_3$ per mole of boehmite. Air pressure forced the sol through the interior of the support tube to its top. The sol was then allowed to immediately drain, producing an about five microns thick gel layer.

The tube containing the gel layer was dried for 24 hours at room temperature and then heated at 30° C./hr to 600° C., followed by heating at 200° C./hr to 1000° C. and holding at 1000° C. for one hour. This produced a membrane according to this invention having an ESL that was all alpha alumina within the precision of X-ray diffraction analysis, had an average pore size of 10–12.5 nm as measured by mercury porosimetry, and was about 4 microns thick.

Figure 4:
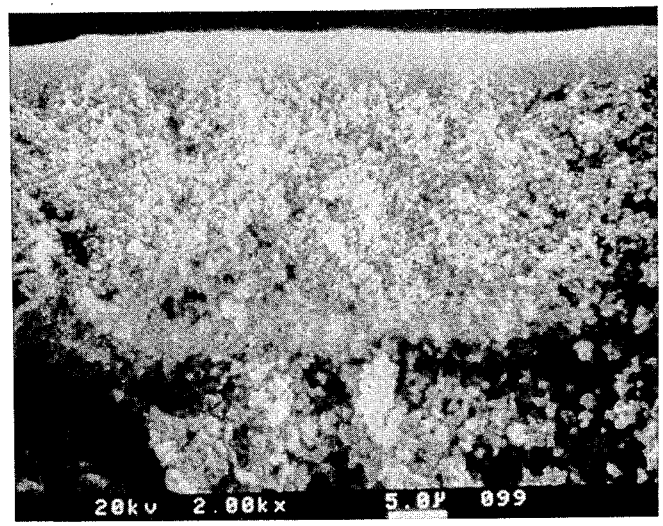
FIGS. 4 and 5 are photomicrographs of the inner cross section of a tube of example 13.
Figure 5:
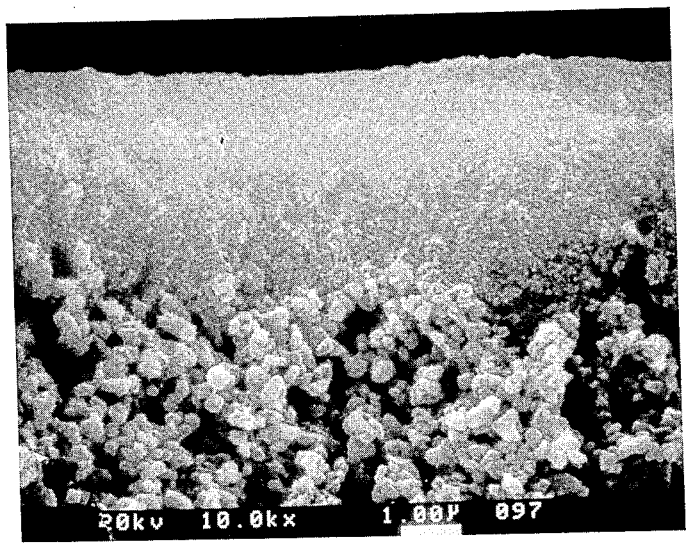

FIGS. 4 and 5 are photomicrographs, at two different degrees of magnification, of the inner cross section of a tube of this example. FIG. 4 shows the ESL as a thin layer on top, the intermediate layer corresponding to the inner layer of the original support tube, with effective pore size of about 0.2 microns dispersion, and at the bottom another portion of the original tube support tube, with effective pore size of about 1 micron. FIG. 5 is on too large a scale to show the latter layers, but shows even better than FIG. 4 the highly uniform porosity achieved in the ESL.

EXAMPLE 14

To determine the effect on the pores produced as a result of the temperature and time of heating used to cause a phase conversion of a supported membrane from boehmite to alpha alumina, both in the presence and in the absence of seeds, the procedures of Example 1 for preparing a sol and depositing it on a tube filter were repeated. The sol used contained 1% boehmite. When seeds were incorporated in the sol they were predominantly alpha alumina and were used in an amount of 0.006%. The results obtained are shown in Table I which illustrates the significant difference in result which occurs due to the use of seeds.

As can be seen, when seeds were used the transformation to alpha is complete within one hour at 1000° C., and the resultant pore size is only a little over 10 nm. However, by holding that seeded alpha membrane at an elevated temperature, i.e. about 1000° C., for extended periods the pore size was slowly increased to more than 40 nm while the pore size distribution remained narrow. Thus, thee presence of seeds not only reduced the alpha conversion temperature as would be expected but also enabled the production of membranes having essentially any desired effective pore diameter from about 10 to about 50 nm, depending upon the extent of high temperature treatment after conversion of the aluminum hydrate to alpha alumina.

For unseeded samples, however, the transformation to alpha was not complete below 1200° C. and when the transformation did occur it was accompanied by an extensive and uncontrollable pore growth that did not permit the production of alpha alumina supported membranes having average pore sizes of less than about 50 nm, as can be readily obtained by the use of seeding.

TABLE I

COMPARISON OF TRANSFORMATION TO ALPHA ALUMINA AND OF PORE SIZE UPON HEATING SEEDED AND UNSEEDED BOEHMITE GELS

| Soak Temperature and Time | Average Pore Size, Nm | Complete transformation to Alpha |
|---|---|---|
| Unseeded | | |
| 600° C. - 3 hours | 8.3 | No |
| 900° C. - 3 hours | 9.1 | No |
| 1000° C. - 1 hour | 9.7 | No |
| 1000° C. - 3 hours | 10.8 | No |
| 1200° C. - <0.1 hour | 11.2 | No |
| 1200° C. - 3 hours | 80.7 | Yes |
| 1300° C. - 1 hour | 76.4 | Yes |
| Seeded | | |
| 600° C. - 3 hours | 8.2 | No |
| 900° C. - <0.1 hour | 8.7 | No |
| 900° C. - 12 hours | 12.1 | No |
| 900° C. - 24 hours | 19.5 | No |
| 950° C. - 6 hours | 9.9 | No |
| 950° C. - 12 hours | 37.1 | Yes |
| 1000° C. - 1 hour | 11.5 | Yes |
| 1000° C. - 3 hours | 32.5 | Yes |
| 1000° C. - 6 hours | 43.3 | Yes |
| 1000° C. - 9 hours | 44.2 | Yes |
| 1100° C. - <0.1 hour | 39.7 | Yes |

Note: All samples from 1% boehmite gels; 0.006% seeds when used. Pore sizes measured by mercury porosimetry and conversion to alpha alumina measured by X-ray diffraction.

What is claimed is:

1. A supported ultrafiltration membrane comprising an effective separating layer consisting essentially of alpha alumina having an effective pore diameter of about 50 nm or less and bonded to a porous support having substantially greater permeability than said effective separating layer.

2. The supported membrane of claim 1, wherein the porous support consists essentially of alpha alumina.

3. The supported membrane of claim 2, wherein said porous support is in the form of a tube.

4. The supported membrane of claim 3, wherein said tube has a plurality of layers with different pore sizes arranged so that a material passing through the wall of the tube will pass through each of said layers.

5. The supported membrane of claim 4, wherein said tube has its finest pore layer on the inside of the tube.

6. The supported membrane of claim 4, wherein said tube has an effective pore diameter of about 100–300 nm in its finest pore layer.

7. The supported membrane of claim 4, wherein said effective separation layer has an effective pore diameter of about 35 to less than about 50 nm.

8. The supported membrane of claim 4, wherein said effective separation layer has an effective pore diameter less than about 35 nm.

9. The supported membrane of claim 1, wherein said effective separation layer has an effective pore diameter of about 35 to less than about 50 nm.

10. The supported membrane of claim 1, wherein said effective separation layer has an effective pore diameter less than about 35 nm.

11. A process for manufacturing a supported alpha alumina ultrafiltration membrane having an effective separating layer bonded to a porous support, said process comprising:
(a) coating a porous support with a layer of alumina hydrate gel having dispersed therein finely divided crystalline seed particles;
(b) drying said gel layer and support; and
(c) heating the dried gel layer and support at a sufficient temperature and for a sufficient time (i) to convert the dried gel to essentially alpha alumina (ii) to bond it to the support, and (iii) to cause the effective separating layer to increase in pore size to less than about 50 nm, but insufficient to reduce its total porosity below about 30 percent.

12. The process of claim 11, wherein said seed particles are at least 80 wt. % alpha alumina.

13. The process of claim 12, wherein said alpha alumina seed particles are present in an amount of at least 0.05 wt. % of the weight of alumina hydrate used to prepare the alumina hydrate gel.

14. The process of claim 13, wherein said alumina hydrate is boehmite.

15. The process of claim 14, wherein said seed particles are derived from self-attrition of vibratory milling media containing at least 80 wt. % alpha alumina.

16. The process of claim 11, wherein said support consists essentially of microporous polycrystalline alpha alumina.

17. A method of preparing a supported alpha alumina ultrafiltration membrane having an effective pore diameter greater than about 10 and up to about 50 nm, which comprises the steps of (i) forming an alumina hydrate gel having dispersed therein finely divided crystalline seed particles, (ii) coating the seed-containing gel onto a porous support to form a gel layer, (iii) drying said gel layer and support, (iv) heating the dried gel layer and support to cause the alumina hydrate to convert to alpha alumina having an effective pore diameter of about 10 nm, and (v) heating the alpha alumina at a sufficient temperature and for a sufficient time to increase the specific effective pore diameter to less than about 50 nm.

18. The method of claim 17, wherein said seed particles are at least 80 wt. % alpha alumina.

19. The method of claim 18, wherein said alpha alumina seed particles are present . in an amount of at least 0.05 wt. % of the weight of alumina hydrate used to prepare the alumina hydrate gel.

20. The method of claim 17, wherein said alumina hydrate is boehmite.

21. The method of claim 17, wherein said seed particles are derived from self-attrition of vibratory milling media containing at least 80 wt. % alpha alumina.

22. The method of claim 17, wherein said support consists essentially of microporous polycrystalline alpha alumina.

23. In a supported alpha alumina ultrafiltration membrane having an effective pore diameter and having been prepared from an alumina hydrate gel, the improvement that said gel has incorporated into it an amount of finely divided crystalline seed particles sufficient to control the effective pore diameter of the membrane to less than about 50 nm after conversion of the alumina hydrate to alpha alumina.

24. The improvement of claim 23, wherein said seed particles are at least 80 wt. % alpha alumina.

25. The improvement of claim 23, wherein the alumina hydrate in the gel is boehmite.

26. The improvement of claim 23, wherein the seed particles are present in an amount of about 0.05 to about 1 wt. % of the weight of the alumina hydrate in the gel.

* * * * *